United States Patent
Fujii et al.

[11] 3,955,919
[45] May 11, 1976

[54] DYESTUFF MIXTURES AND PROCESS FOR DYEING POLYESTER FIBER THEREWITH

[75] Inventors: Fumio Fujii; Ken Mukai; Tetsuo Watanabe; Hiroshi Aiga, all of Omuta, Japan

[73] Assignee: Mitsui Toatsu Chemicals, Incorporated, Tokyo, Japan

[22] Filed: Apr. 10, 1973

[21] Appl. No.: 349,773

Related U.S. Application Data

[63] Continuation-in-part of Ser. No. 85,234, Oct. 29, 1970, abandoned.

[30] Foreign Application Priority Data

Nov. 5, 1969 Japan............................ 44-88046
Nov. 5, 1969 Japan............................ 44-88048
June 23, 1970 Japan........................... 45-54012

[52] U.S. Cl. .................................. 8/26; 8/41 C; 260/207; 260/207.1
[51] Int. Cl.² ............ C09B 27/00; C09B 45/48; D06P 1/00; D06P 3/00
[58] Field of Search ............. 8/26, 41 C; 260/207, 260/207.1

[56] References Cited
UNITED STATES PATENTS

3,533,722  10/1970  Wegmüller ........................... 8/26
3,621,009  11/1971  Ono et al. ........................... 8/26 X Primary Examiner—Leland A. Sebastian
Assistant Examiner—T. S. Gron
Attorney, Agent, or Firm—Fisher, Christen & Sabol

[57] ABSTRACT

Mixtures of water-insoluble monoazo dyestuffs are disclosed together with the dyeing, padding or printing of polyester material therewith.

The water-insoluble monoazo dyestuffs of the following general formula (A)

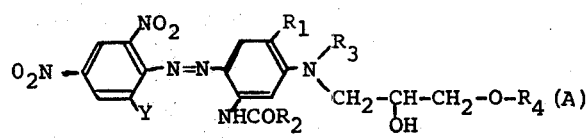

in which Y represents hydrogen, chlorine, bromine, methyl, ethyl, methoxy, ethoxy or cyano; $R_1$ represents methoxy, ethoxy or phenoxy; $R_2$ represents methyl or ethyl; $R_3$ represents hydrogen, methyl, ethyl, cyanoethyl or allyl; and $R_4$ represents methyl, ethyl, propyl, butyl, allyl or phenyl, are suitable for the production of inexpensive navy shades of good fastness to light, washing, perspiration, sublimation and heat setting; however, difficulties sometimes arise in the case of these dyestuffs.

The improvement disclosed comprises overcoming said difficulties and providing new navy shades by using a mixture of at least two dyestuffs, in one of which the Y constituent above is hydrogen and in the other of which the Y constituent is replaced by constituent X which represents chlorine, bromine, methyl, ethyl, methoxy, ethoxy or cyano.

5 Claims, 1 Drawing Figure

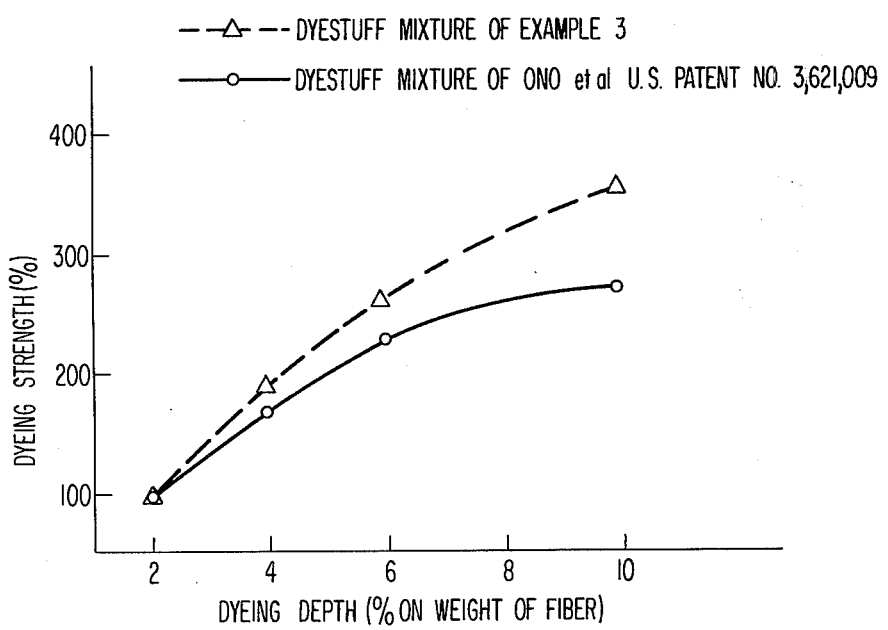

DYESTUFF MIXTURES AND PROCESS FOR DYEING POLYESTER FIBER THEREWITH

CROSS-REFERENCE TO RELATED APPLICATION

This application is a continuation-in-part of application Ser. No. 85,234 filed Oct. 29, 1970, now abandoned.

BACKGROUND OF THE INVENTION

1. Field of the Invention

This invention relates to mixtures of water-insoluble monoazo dyestuffs and to the dyeing, padding or printing of polyester material therewith.

2. Description of the Prior Art

In the known processes for the dyeing of aromatic polyester material it is usual to carry out the process in closed circulation vats in which the material, for example, in the form of yarns on crosswound bobbins or fabrics in the form of so-called wound webs is introduced into the dyeing apparatus in a manner such that the dye liquor can circulate through the fibrous material. This method of dyeing demands a very high stability in the dyestuff dispersions used. If the stability of the dispersion is insufficient, so-called filtration effects are produced; that is to say, part of the dyestuff is held back on the surface of the fibrous material and deposited thereon so that the dyeing obtained is uneven and is not fast to rubbing.

The water-insoluble monoazo dyestuffs of the general formula (A)

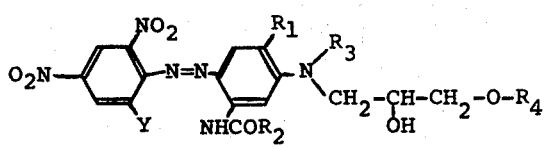

(A)

in which
Y represents hydrogen, chlorine, bromine, methyl, ethyl, methoxy, ethoxy or cyano
$R_1$ represents methoxy, ethoxy or phenoxy
$R_2$ represents methyl or ethyl
$R_3$ represents hydrogen, methyl, ethyl, cyanoethyl or allyl and
$R_4$ represents methyl, ethyl, propyl, butyl, allyl, or phenyl are suitable for the production of inexpensive navy shades of good fastness to light, washing, perspiration, sublimation and heat setting, but the above-mentioned difficulties sometimes arise when dyeing with these dyestuffs.

SUMMARY OF THE INVENTION

The present invention is based on the observation that the aforementioned difficulties can be overcome in s simple manner by dyeing the polyester fibers with mixtures of dyestuffs of the formulae (1) and (2)

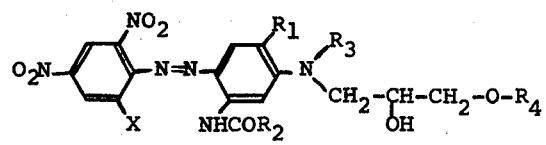

(1)

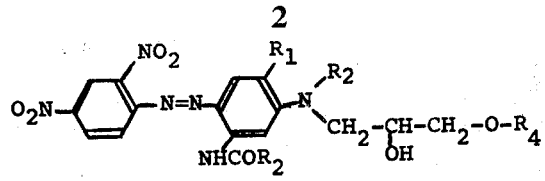

(2)

in which X represents chlorine, bromine, methyl, ethyl, methoxy, ethoxy or cyano; $R_1$, $R_2$ and $R_3$ represent the same meanings respectively as in formula (A), and $R_4$ represents methyl, ethyl, propyl, butyl, allyl, phenyl or a mixture thereof.

The proportions of the contituent dyestuffs of the mixtures may vary within wide limits but it is of advantage to use them at a ratio such that the proportion of each constituent dyestuff is at least 5% or preferably at least 10% by weight.

The mixtures referred to above can be prepared by intimately mixing the previously made constituent dyestuffs.

Instead of mixing the previously made constituent dyestuffs, it is possible to perform a mixed synthesis; that is to say, to diazotize the mixture of 2,4-dinitroaniline and an amine of the formula (3)

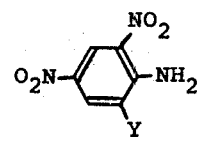

(3)

in which Y has the same meaning as defined in formula (A) and to couple the same with an amine of the formula (4)

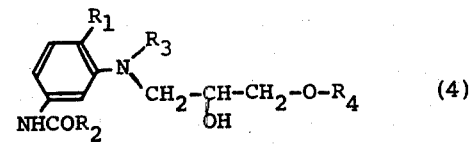

(4)

in which $R_1$, $R_2$, $R_3$ and $R_4$ have the same meanings as defined in formula (1).

BRIEF DESCRIPTION OF THE DRAWING

The drawing is a graph showing a comparison of the dyeing strength of the dyestuff mixture of Example 3 of this application with that of a dyestuff mixture according to Ono et al. U.S. Pat. No. 3,621,009.

DESCRIPTION OF THE PREFERRED EMBODIMENTS

For dyeing purposes the above-mentioned dyestuff mixtures are advantageously used in a finely dispersed form, the dyeing operation being performed in the presence of a dispersant such as sulfite cellulose waste liquor or of a synthetic detergent, or of a combination of different wetting agents and dispersants. As a rule, it is of advantage to convert the dyestuffs to be used, before dyeing, into a dyeing preparation containing a dispersant and to use the finely dispersed dyestuffs in a form such that a fine dispersion is obtained on diluting the dyestuff preparation with water. Such dyestuff preparations may be made in any known manner, for example by grinding the dyestuff with sulfite cellulose waste liquor or, if desired, by grinding the dyestuffs in a highly efficient mill in the wet form, and adding a dispersant during the grinding operation.

To produce dyeing of superior tinctorial strength on polyester fibers it is advantageous to add a swelling agent to the dyebath, or more especially to perform the dyeing operation under superatmospheric pressure at a temperature above 100°C., for example at 130°C.

When dyeing under superatmospheric pressure, it is advantageous to maintain a weakly acid reaction in the dyebath, for example by adding acetic acid to maintain a pH from 4.0 to 5.5.

The dyestuff mixtures of the presnet invention are also suitable for dyeing by the so-called thermofixation method. In this method, the fabric to be dyed is impregnated with an aqueous dispersion of the dyestuff mixture containing from 1.0 to 30% by weight of said dyestuff mixture. The dispersion also advantageously contains from 1 to 50% by weight of urea based on the weight of the dyestuff mixture and from 0.1 to 5.0% of a thickener such as sodium alginate. In place of the urea there can be used such compounds as thiourea and addition product of alkyl phenols, and ethylene oxide. Besides sodium alginate, other thickeners which can be used include carboxymethyl cellulose, ammonium polyacrylate, sodium acetate and sodium chloride. The impregnation can be conducted at a temperature from 10° to 80°C., preferably not exceeding 60°C. and the impregnated fabric is then squeezed in the conventional manner to provide a weight increase of 30 to 150%, advantageously from 50 to 100%. To fix the dyestuff, the impregnated fabric is advantageously dried, for example in a current of warm air, and then heated at a temperature over 100°C., for example from 160° to 240°C. and preferably between 180° and 220°C.

The present process provides strong, full dyeings and prints having excellent properties of wet fastness and, above all, outstanding fastness to light and sublimation.

A further advantage of the mixtures to be used in the present process is that their build-up is much better than that of the constituent dyestuffs as such.

The dyestuff mixtures of the present invention differ from the dyestuff mixtures of U.S. Pat. No. 3,621,009 to Ono et al. with respect to the color tone of polyester fiber dyed therewith. The color tone of polyester fiber dyed with the dyestuff mixture of the Ono et al. patent is navy blue, whereas the color tone of polyester dyed with the dystuff mixtures of the present invention is reddish navy blue.

Unless otherwise indicated, parts and percentages throughout the specification and in the following examples are by weight.

EXAMPLE 1

An aqueous paste A-1 containing 20 parts of the dyestuff of the formula (5)

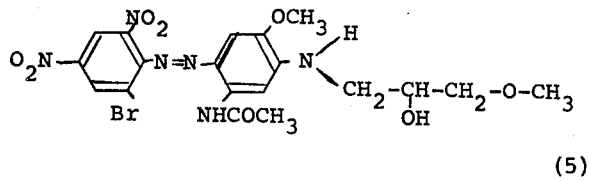

(5)

and 5 parts of the dyestuff of the formula (6)

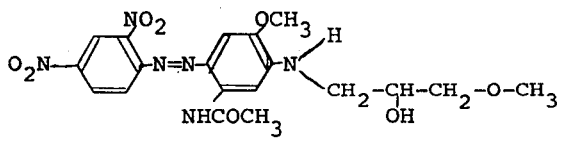

(6)

was ground with 75 parts of sodium lignin sulfonate until a smooth paste containing about 10% of the dyestuffs had formed.

Five parts of polyethylene terephthalate fiber material were immersed in 150 parts of water which contained 0.15 part of nonionic surface active agent and 0.01 part of chelating agent to form a dyebath.

One part of A-1 paste (dyeing depth of 2% based on the weight of fiber), 2 parts of A-1 paste (dyeing depth 4%) 3 parts of A-1 paste (dyeing depth 6%), 4 parts of A-1 paste (dyeing depth 8%) and 5 parts of A-1 paste (dyeing depth 10%) were added respectively to 5 separate dyebaths prepared as above, and each was heated in an autoclave to 130°C. and kept at that temperature for about an hour. The fiber was then thoroughly rinsed and washed for 10 minutes at 70° to 80°C. in a solution containing 2 grams per liter each of sodium hydroxide, sodium dithionite and a nonionic surfactant and then was rinsed again and dried.

The resulting color of dyeing with the 8% dyeing depth dyebath was a very deep reddish navy blue and it displayed excellent fastness to sublimation and light.

Aqueous pastes B-1 containing 25 parts of the dyestuff of formula (5) and C-1 containing 25 parts of the dyestuff of formula (6) each were ground with 75 parts of sodium lignin sulfonate until smooth pastes containing about 10% of the dyestuffs had formed. Polyethylene terphthalate fiber material was dyed separately with the pastes B-1 and C-1 in the same manner described above for paste A-1. Dyeing depths of 2%, 4%, 6%, 8% and 10% were tested for paste B-1 and dyeing depths of 2%, 6% and 10% were tested for paste C-1. The resulting color of dyeing with paste B-1 was a somewhat greenish navy blue and that with paste C-1 was violet. The percentage of the color value of a product dyed with pastes A-1 and C-1 based on the color value of a product of same dyeing depth dyed with paste B-1 was calculated. The results thus obtained are shown in Table 1. The test results in Table 1 show conclusively that the build-up percentage of paste A-1 was superior to the values calculated from that of pastes B-1 and C-1.

Table 1

| Dyestuff | | Percentage of color value based on the color value of B-1 | | | | |
| --- | --- | --- | --- | --- | --- | --- |
| | | Dyeing Depth | | | | |
| | | 2% | 4% | 6% | 8% | 10% |
| | B-1 | 100 | 100 | 100 | 100 | 100 |
| | C-1 | 100 | | 131 | | 188 |
| | (I) observed | 100 | 115 | 123 | 143 | 154 |
| A-1 | (II) calculated | 100 | | 106 | | 118 |
| | $\frac{(I)}{(II)} \times 100$ | 100 | | 116 | | 142 |

EXAMPLE 2

An aqueous paste containing 80 parts of the dyestuff of formula (7)

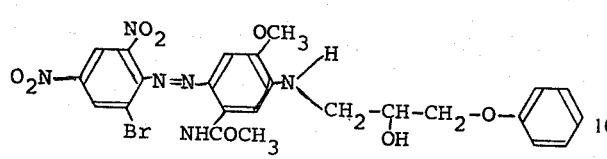

(7)

and 20 parts of the dyestuff of the formula (8)

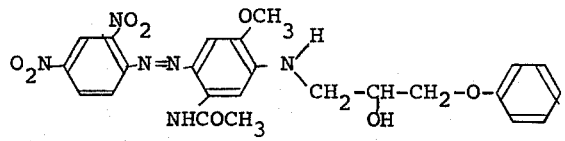

(8)

was ground with 300 parts of sodium lignin sulfonate until a smooth paste containing about 10% of the dyestuffs had formed.

Five parts of polyethylene terephthalate fiber material were immersed in a dyebath containing 1 part of the dyestuff paste prepared as described above dispersed in 150 parts of water which contained 0.15 part of nonionic surface active agent, and dyed as described in Example 1. The resulting reddish navy blue dyeing displayed excellent fastness to sublimation and light.

The dyestuff mixture used above was prepared as follows: 20.2 parts of 2,4-dinitro-6-bromoaniline and 4.2 parts of 2,4-dinitroaniline were dissolved in 50 parts of concentrated sulfuric acid, and 100 parts of nitrosyl sulfuric acid prepared from 7 parts of sodium nitrite and 93 parts of concentrated sulfuric acid were added at 15° to 20°C. The resulting diazo solution was stirred for one hour and then poured into a solution of 24.5 parts of 3-N-(β-hydroxy-γ-phenoxypropyl)amino-4-methoxyacetanilide in dilute hydrochloric acid. The mixture was stirred for 1 hour at 0° to 5°C. and then 170 parts of sodium carbonate were added. The black dyestuff mixture obtained in this manner was suctioned off. The build-up of this dyestuff mixture was 140% compared with that (100%) of the constituent dyestuff of the formula (7).

For purposes of comparison of color tone, polyethylene terephthalate fiber material was dyed in the same manner as above with an aqueous paste of a dyestuff mixture according to Ono et el. U.S. Pat. No. 3,621,009, i.e., a mixture of 80 parts of the dyestuff of formula (7) and 20 parts of the dyestuff of formula (5). The resulting color tone was navy blue.

EXAMPLE 3

An aqueous paste containing 24 parts of the dyestuff of the formula (9),

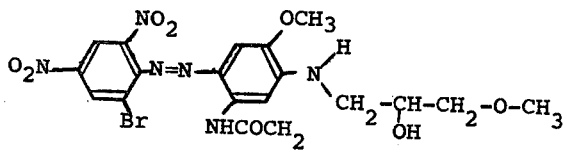

(9)

56 parts of the dyestuff of the formula (10),

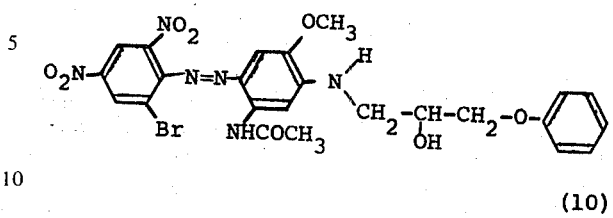

(10)

6 parts of the dyestuff of the formula (11)

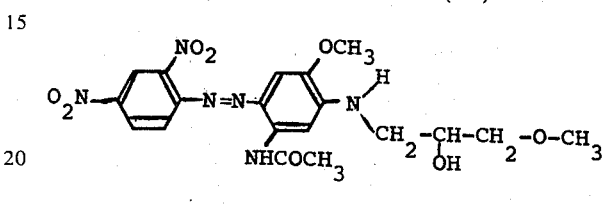

(11)

and 14 parts of the dyestuff of the formula (12)

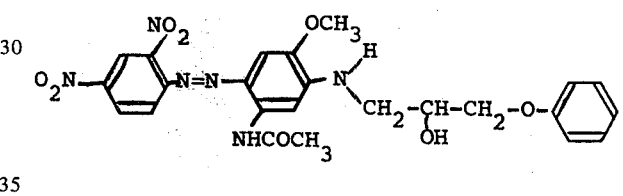

(12)

was ground with 300 parts of sodium dinaphthylmethanedisulfonate.

Polyethylene terephthalate fiber material was dyed with the paste in the same manner as described in Example 1 and the resulting strong and level reddish navy blue color displayed excellent fastness to light, rubbing and sublimation.

The dyeing strength of the dyestuff mixture of Example 3 was compared with that of a dyestuff mixture according to Ono et al. U.S. Pat. N0. 3,621,009, i.e., a mixture of 30 parts of the dyestuff of formula (9) and 70 parts of the dyestuff of formula (10) and the result thus obtained is shown in the drawing. The test results in the drawing show conclusively that the build-up property of the dyestuff mixture of Example 3 was superior to that of the dyestuff mixture of the Ono et al. patent.

In the presnent invention, in addition to the sulfite cellulose waste liquor, other dispersants which may be used include dinaphthylmethane disulfonates, the condensation product of cresol with formaldehyde and sodium sulfite, the alkaline salts of the sulfuric acid esters of fat alcohols. Suitable synthetic detergents include the addition products of approximately 20 – 40 moles of ethylene oxide and alkylphenols. Other wetting agents which may be used include dialkyl sulfosuccinate.

Suitable as swelling agents to be added to the dyebath are o-phenylphenol, p-phenxlphenol, alkyl naphthalene and trichlorobenzene. The superatmospheric pressures which may be used in the dyeing operation may range from 0.8 atom to 3.0 atom e.g. about 1.8 atom. In dyeing under superatmospheric pressure, in place of acetic acid, other acids which may be used to maintain the weakly acid reaction in the dyebath include phosphoric acid, tartaric acid, citric acid and ammonium sulphate.

In the foregoing Example 1, the nonionic surface active agent used in the dyebath was the addition product of 30 moles of ethylene oxide and nonyl phenol, and the chelating agent used therein was sodium ethylene diamine tetraacetic acid. Other suitable chelating agents include nitrilo triacetic acid. The anionic surfactant used in the rinsing bath was a dialkyl sulfosuccinate.

In Example 2, the nonionic surface active agent used in the dyebath was the same as in Example 1.

What is claimed is:

1. A mixture of dyestuffs of the formulae (1)–(4)

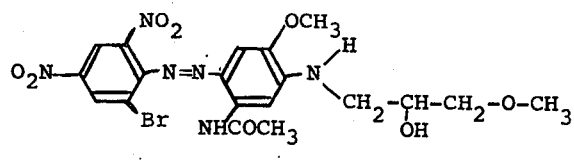

(1)

(2)

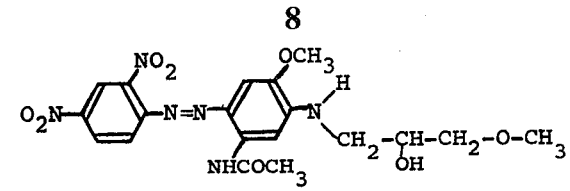

(3)

(4)

wherein each constituent dyestuff is present in an amount of at least 5% by weight.

2. A process which comprises dyeing aromatic polyester fibers with an aqueous dispersion of the dyestuff mixture of claim 1.

3. The process as claimed in claim 2, wherein a swelling agent is added to the dyebath.

4. The process as claimed in claim 2 carried out under superatmospheric pressure and at a temperature above 100°C.

5. The process as claimed in claim 2 carried out by a thermofixation method.

* * * * *